(No Model.)
W. P. & R. P. THOMPSON.
VALVE FOR REDUCING AND REGULATING PRESSURE OF FLUIDS.
No. 401,982. Patented Apr. 23, 1889.
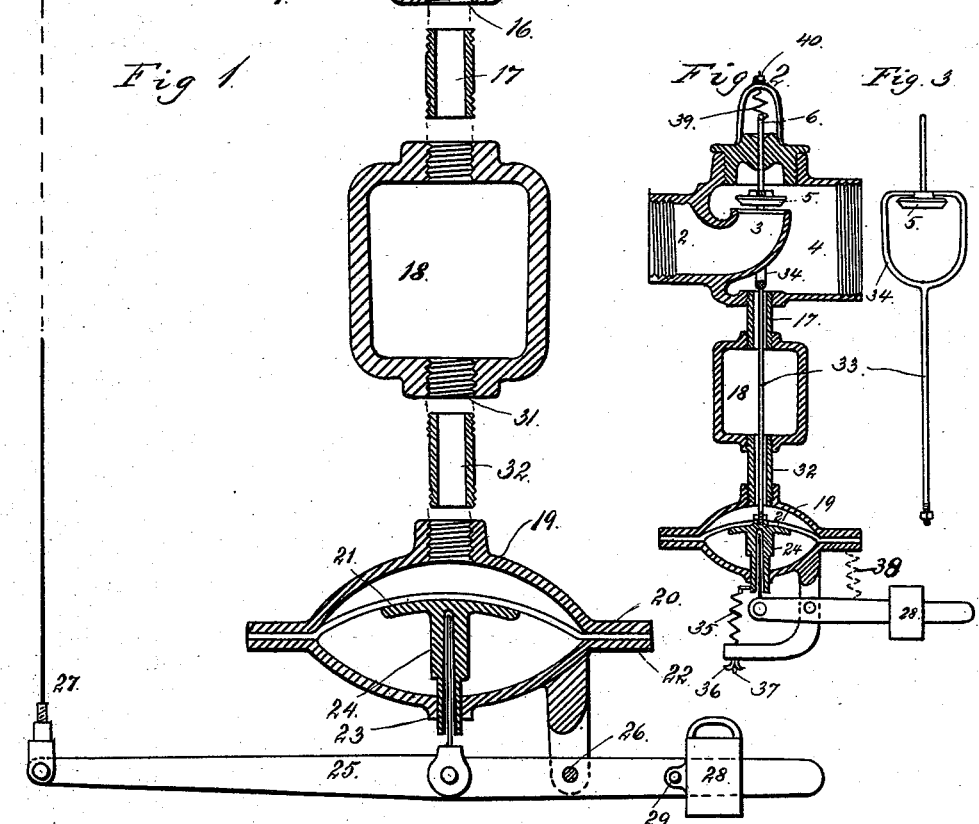

UNITED STATES PATENT OFFICE.

WILLIAM P. THOMPSON AND ROBERT P. THOMPSON, OF PHILADELPHIA, PENNSYLVANIA.

VALVE FOR REDUCING AND REGULATING PRESSURE OF FLUIDS.

SPECIFICATION forming part of Letters Patent No. 401,982, dated April 23, 1889.

Application filed January 29, 1889. Serial No. 297,951. (No model.)

*To all whom it may concern:*

Be it known that we, WILLIAM P. THOMPSON and ROBERT P. THOMPSON, both citizens of the United States, and both residing at Philadelphia, in the county of Philadelphia and State of Pennsylvania, have invented certain new and useful Improvements in Valves for Reducing and Regulating Pressure of Fluids; and we do hereby declare the following to be a sufficiently full, clear, and exact description thereof as to enable others skilled in the art to make and use the said invention.

This invention relates to valves for reducing fluid-pressure and regulating and controlling the same, and is useful in conjunction with steam-boilers supplying power and also heating apartments.

It has for its object the more exact control of the reduced pressure under greater variations in a high-pressure supply and preventing the draft for reduced pressure lowering the high-pressure supply to less than a fixed minimum; and it consists in an arrangement of diaphragms, valves, levers, connecting-links, and adjustable weights or springs, whereby the more complete control is effected, as will fully hereinafter appear.

The apparatus for effecting this is shown in sectional elevation in Figure 1 of the drawings annexed, and in a modified form in Fig. 2 the same parts are indicated by the same reference-marks in all the figures. Fig. 3 shows a detail of parts shown in Fig. 2.

1 represents the valve-body, having an entrance, 2, communicating through the valve-seat 3 with an exit, 2, of larger area, preferably, than the entrance 2. A valve susceptible of vertical motion (marked 5) closes downwardly upon the seat 3, and is provided with a stem, 6, passing upwardly through a gland, 7, to the under side of the lever 8, having a fulcrum, 9, attached to a collar, 10. The collar 10 is held down on the valve-body by the flange 12 upon the face or bonnet 13, so that it may be turned about horizontally in any direction. Upon the lever 8 is a weight or pea, 14, made adjustable thereon in the direction of its length, and provided with a set-screw, 15, by which it may be secured in any adjustment.

In fluid communication with the low-pressure or exit side 4 of the valve-body 1, and in the same line of axis as the valve-seat 3, valve 5, and valve-stem 6 is a screw-threaded opening, 16, to which, by a threaded pipe-nipple, is screwed a water-chamber, 18, which is provided at the lower side in the same axial line with the nipple 17 with another screwed aperture, to which, by a threaded nipple, 18, is connected a bowl, 19, having a flange, 20, against which a diaphragm, 21, is secured by a flange, 22, having a guide, 23, formed thereon, through which a plunger, 24, slides. To the plunger 24 is attached a two-armed lever, 25, having a fulcrum, 26, secured to a flange, 22, upon which fulcrum the lever 25 vibrates. Upon one arm of the lever 25 is pivotally attached a rod, 27, of adjustable length, extending upwardly to and connected with the extremity of the lever 8, the connection of the rod 25 being slotted or formed with a link or in any equivalent manner to permit lost motion, or motion upwardly of the lever 25 without imparting upward motion to the lever 8, but so that downward motion of the lever 25 and the rod 27 is attended with downward motion of the lever 8. To the opposite arm of the lever 25 is attached adjustably a pea, 28, provided with a set-screw, 29, by which it may be secured in any desired adjustment upon the lever-arm.

The operation of this invention is as follows: Steam being admitted in the inlet 2 by a pipe connecting it with the steam-boiler, as soon as it exceeds in pressure the load on the valve 5 forces the valve 5 upwardly from its seat 3, passing through the exit-space 4, descends through the opening 16, nipple 17, water-receptacle 18, aperture 31, and nipple 32 into the bowl 19, where it presses downwardly upon the diaphragm 21, forcing the plunger 24 downwardly and with it the lever 25, depressing the valve-stem 6 and valve 5, closing the valve 5 into the seat 3. By adjusting the weight 28 at a distance from the fulcrum 26 the amount of force requisite before such closure can take place is increased by moving it toward the fulcrum 26. The amount of pressure requisite for such closure is diminished by intermediate adjustments. It is proportionably varied by moving the pea 14 upon the lever 8 toward the point of attachment of the rod 25. The amount of force requisite to open or raise the admission-valve 5 from the seat 3 is increased. By moving the weight 14 nearer to the fulcrum 9 the amount of force requisite to open the valve 5 from the seat 3 is reduced. By intermediate adjustments the amounts of force are proportionably varied. By the combined action of the two levers 25 and 8, as controlled by the adjustment of the weight 14 and 28, any desired degree of sensitiveness in the operation of the mechanism is procured.

The valve 5 can be only raised from the seat 3 when the pressure beneath it exceeds the load imposed upon it by the lever and weight, and therefore no draft of steam from the low-pressure side of the valve can reduce the pressure below the minimum to which the valve is set.

By the combined action of the pressure of fluid upon the diaphragm 21, operating upon the lever 25 and closing, through the action of the rod and lever 8 on the valve 5, any excess of pressure on the low-pressure or exit side 4 of the valve 5 is prevented or automatically corrected. The water-chamber 18 serves to collect water from condensation, and by the slow-conducting properties of the water to protect the diaphragm 21 from the temperature of the steam. By connecting the bowl 19 by means of screw-threads 19 and 31 and nipples 17 and 32 the position or angle of the lever 25 can be varied, as can also the angle or position of the lever 8 by turning the collar 10 around on the collar 11, thus rendering the valve-fixture of easy adaptation to any situation where it may be required to be used.

In the form of the invention shown in Fig. 2 the lever 8 is dispensed with, and instead of transmitting the closing motion to the valve 5 through the stem 6, lever 8, rod 27, and lever 25, and from the diaphragm 21, such motion is transmitted through a rod, 33, having an inverted stirrup, 34, resting upon the top of the valve 5 in the low-pressure cavity between the valve-seat 3 and the exit 4 of the valve-body, and extending downwardly through the tubes 17 and 32 and water-chamber 18 into the bowl 19, where it is secured to the plunger 24, attached to the diaphragm 21, as shown in Fig. 2. A spring, 35, of adjustable tension, applied to the lower end of the plunger 24, connected to the lower end of the rod 33, serves to close the valve 5. Being adjusted in tension by means of a screw, 37, and nut 36, the pressure requisite to open the valve 5 by this means may be varied and controlled. The inner arm of a lever, 37, serves to produce an upward motion of the diaphragm by the weight or pea 28, applied adjustably to the outer arm of the lever 25, and an adjustable spring, 38, as shown in dotted lines, may be substituted for the weight and lever 27 with similar effect. The minimum of pressure in the high-pressure pipe at which fluid may be drawn to the low-pressure pipe is determined by a spring, 39, and screw 40 in the same manner as the lever 8 and weight 14 in Fig. 1.

Having described our invention, what we claim is—

1. The combination of a valve opening outwardly from a high-pressure pipe to a low-pressure pipe with a loaded lever and an adjustable weight, or the desired equivalent thereof, combined with a diaphragm in fluid communication with the low-pressure pipe and connected to the valve with a rod arranged to close, but not to open, the valve, and with a lever and an adjustable weight, or their described equivalent, arranged to counteract the fluid-pressure on the diaphragm and increase the pressure required in the low-pressure pipe required to cause closure of the valve, substantially as set forth.

2. In an apparatus for reducing fluid-pressure from a high pressure and adjustably regulating such low pressure, and limiting automatically the reduction of the high-pressure supply in such operation, the combination of a valve opening outwardly from a high-pressure pipe to a low-pressure pipe, and closed by a loaded lever having a fulcrum arranged to rotate about the axis of said valve, with a water-chamber screwed to the low-pressure pipe, and a connected bowl and diaphragm located below the valve-chamber, and all in the same axial line therewith, and a second adjustable loaded lever bearing upwardly against the diaphragm and arranged to receive downward motion from the diaphragm, and connected by a link transmitting a closing motion through the valve-lever, substantially as and for the purpose set forth.

WM. P. THOMPSON.
ROBT. P. THOMPSON.

Witnesses:
A. VAN WYCK BUDD,
J. DANIEL EBY.